Nov. 4, 1947.  N. BURGESS  2,429,990
GAS TURBINE
Filed July 17, 1944
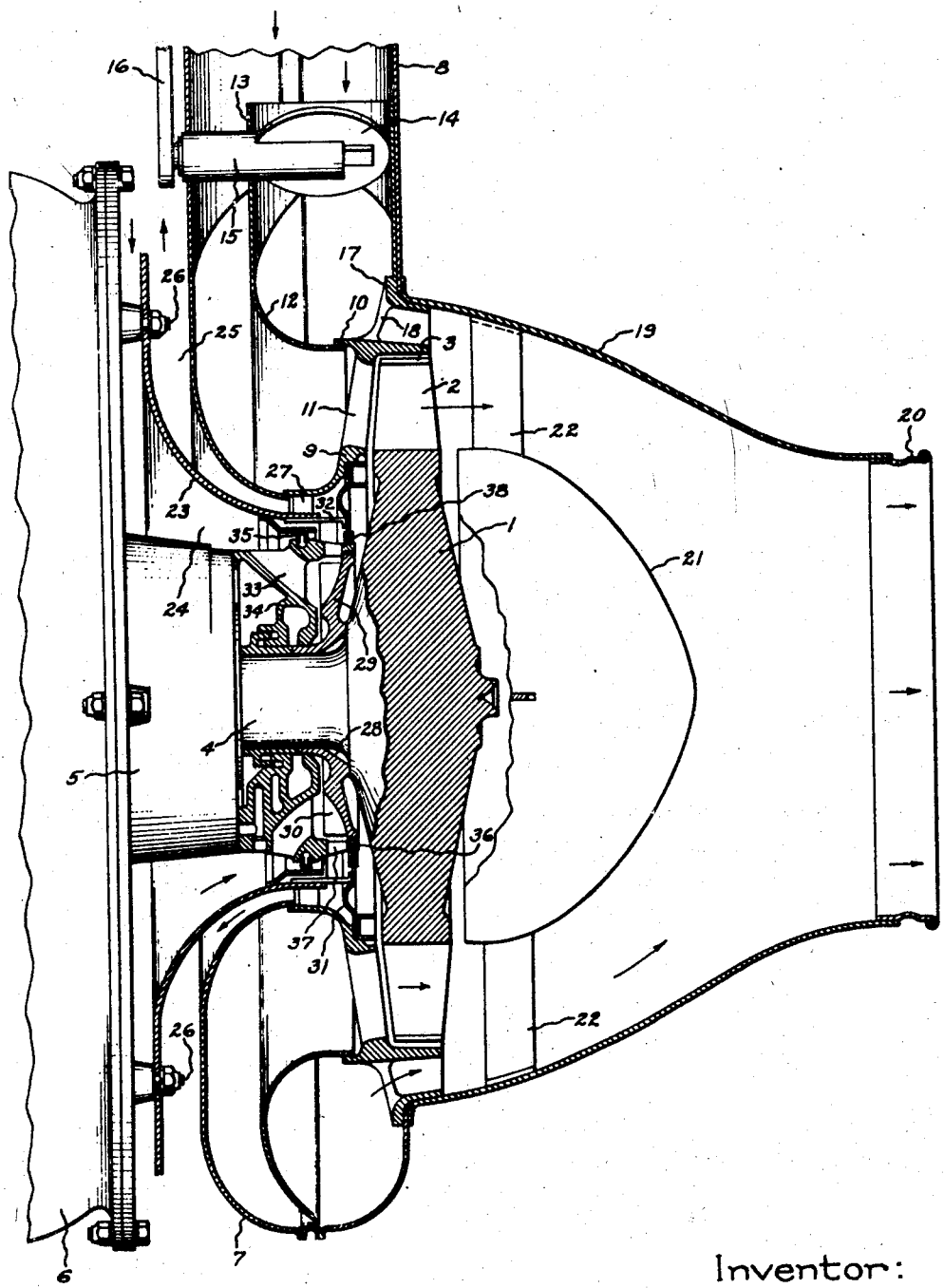
Inventor:
Neil Burgess,
by Harry E. Dunham
His Attorney.

Patented Nov. 4, 1947

2,429,990

UNITED STATES PATENT OFFICE 2,429,990

GAS TURBINE

Neil Burgess, Melrose, Mass., assignor to General Electric Company, a corporation of New York Application July 17, 1944, Serial No. 545,261

4 Claims. (Cl. 253—39)

1

The present invention relates to gas turbines, more particularly to exhaust gas operated turbines for driving aircraft superchargers. These turbines usually include a nozzle box for conducting gases to a bucket wheel and a waste conduit for by-passing some of the gases with regard to the bucket wheel for speed control. The control of gases to the bucket wheel usually is effected by a valve in the waste conduit which controls the discharge of gases from the nozzle box directly to the atmosphere. In previous arrangements the available energy of the waste gases has been completely lost.

One object of my invention is to provide an improved construction and arrangement of gas turbines of the type above specified whereby part of the available energy of the gases bypassed with regard to the bucket wheel is regained.

Another object of my invention is to provide a gas turbine with improved cooling means to reduce heat radiation from the nozzle box to the compressor or other apparatus associated therewith.

For a consideration of what I believe to be novel and my invention, attention is directed to the following description and the claims appended thereto in connection with the accompanying drawing.

The single figure of the drawing illustrates a sectional view of an aircraft gas turbine embodying my invention.

The turbine comprises a bucket wheel 1 which has a solid disk with a rim and a plurality of circumferentially spaced buckets 2 with an outer cover or shroud portion 3. The wheel is secured to, and in the present example integrally formed with, a shaft 4. The shaft is supported in a bearing 5 and arranged to drive a machine, in the present instance a centrifugal compressor 6 for supercharging an internal combustion engine or for pressurizing an airplane cabin.

The turbine has an annular nozzle box 7 located on the inlet side of the wheel and radially spaced from the bearing 5. The nozzle box has an inlet conduit 8 for receiving exhaust gases from an internal combustion engine or like source. The box has a nozzle ring or structure including inner and outer walls or bands 9, 10 with circumferentially spaced partitions 11 secured to the walls and forming therewith nozzle passages for conducting operating gases to the passages defined between the buckets 2. As pointed out above, these turbines include a waste conduit through which some of the gases may be discharged directly to the atmosphere, that is, bypassed with regard to the bucket wheel. In accordance with my invention I provide a waste conduit disposed within and partly formed by the nozzle box. In the present example the arrangement includes an annular waste conduit or waste box 12 located within and partly formed by an outer wall portion of the nozzle box. This waste box 12 has an inlet 13 located within the inlet conduit 8 of the nozzle box.

During operation some of the operating gases are conducted from the conduit 8 through the inlet 13 to the waste box 12. The flow of gases to the waste box 12 is controlled by a butterfly valve 14 held on a shaft 15 and adjustable by means of an arm 16 located outside the conduit 8 and secured to the shaft 15. The gases are discharged from the waste box 12 in the form of an annular jet surrounding the annular jet of gases discharged from the bucket wheel 1. To this end the waste box is preferably provided with an annular nozzle structure including the aforementioned wall 10 and another wall 17 radially spaced from the wall 10 and connected thereto by a plurality of circumferentially spaced vanes or partitions 18 forming nozzle passages for directing the waste gases into an exhaust hood 19 which latter is common to the bucket wheel and the waste conduit. The hood 19 has a rearwardly extending discharge nozzle 20, for directing the gases into the atmosphere opposite to the direction of flight, that is, in direction of the slipstream. With such arrangement the discharge of the waste gases has two important effects: first, it induces the discharge of exhaust gases from the turbine wheel, lowering the back pressure thereof and thereby reducing the inlet pressure required, and second, the waste gases together with the exhaust gases passing through the hood act as a jet to propel the aircraft.

The turbine includes means to preclude excessive heating of the discharge side of the bucket wheel. This means is in the form of a wheel shield 21 concentrically disposed within the exhaust hood 19 adjacent the disk of the bucket wheel and supported on the wall of the hood by a plurality of circumferentially spaced vanes 22 for directing the discharge flow of exhaust and waste gases. The wheel shield 21 may be supplied in known manner with cooling air if positive cooling of the wheel disc is desired.

The radiation of heat from the nozzle box towards the bearing 5 is reduced by an annular partition or baffle 23 concentrically surrounding the bearing 5 and forming therewith and with the nozzle box two annular channels 24 and 25. The baffle 23 also acts as a support for the nozzle box on the casing of the compressor 6. To this end an outer portion of the baffle 23 is secured to the compressor by a plurality of studs 26 and the inner end of the baffle is fastened to the nozzle box by circumferentially spaced bosses 27. Air or like cooling medium is circulated through the channels 24 and 25 by the action of an impeller 28 adjacent the bucket wheel 1. The impeller has a disk 29 securely fastened to the shaft 4 and a plurality of circumferentially spaced vanes 30 formed on or secured to one side of the disk facing away from the wheel 1.

During operation rotation of the impeller 28 induces a flow of air from the atmosphere through the channel 24 around the inner end of the baffle into the channel 25 and back to the atmosphere. A seal is provided between the rim of the impeller 28 and the nozzle box in order to prevent cooling air from leaking into the clearance space between the nozzle and the bucket passages, which might cause burning of the rich exhaust gas mixtures sometimes used as a driving fluid. This sealing means includes a corrugated stationary disk or ring 31 having an inner edge loosely sealed to the annular extension 36 of the bearing housing end cap 34, and an outer edge sealed to the inner band 9 of the nozzle structure. An intermediate portion of the disk 31 is supported by brackets 32 on the baffle 23. The inner end of the channel 24 includes a passage 33 formed in an end cap 34 of the bearing 5. This end cap is sealed to the inner end of the baffle 23 by means of a sealing ring 35 to prevent recirculation of the air passing through the impeller 28. During operation all of the air in channel 24 must pass through the passages formed between the impeller vanes 30 on its passage to the channel 25. In the present example the end cap 34 of the bearing 5 has cylindrical extension 36 forming a labyrinth packing with the rim of the disk 29 and having circumferentially spaced passages 37 for directing medium impelled by the impeller 28 into the channel 25. The outer surface of the cylindrical extension 36 has a close but sliding fit with a ring 38 which in turn is sealed to the aforementioned corrugated ring 31. A somewhat similar sealing arrangement is more fully described in the copending application of C. H. Auger, Serial No. 541,244, filed June 20, 1944, and assigned to the same assignee as this application.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. In a turbine the combination of an axial flow bucket wheel, an inlet conduit including an inlet pipe communicating with a first annular chamber having an annular row of nozzles for conducting motive fluid in a generally axial direction to the wheel, means for bypassing turbine motive fluid from the inlet conduit around the bucket wheel comprising walls defining a second annular chamber concentric with said first chamber and having an annular row of openings concentrically surrounding said nozzles and arranged to discharge the bypassed flow to form an annular jet, substantially parallel to, concentric, and merging with the discharge flow from the bucket wheel, a common exhaust conduit for receiving the turbine discharge flow and the bypass flow, and valve means for apportioning the flow of fluid from the inlet conduit to said first and second chambers.

2. In the turbo-machine the combination of a shaft, an axial flow rotor secured to the shaft, an inlet conduit including an inlet pipe and an annular nozzlebox concentric with the shaft and having an annular row of nozzles arranged to supply fluid in a generally axial direction to the rotor, means for bypassing fluid around the rotor including an annular wastebox having an inlet opening communicating with the inlet conduit, said wastebox being concentric with the nozzlebox and having an annular row of openings surrounding said nozzles and arranged to discharge the bypassed fluid to form an annular jet substantially parallel to, concentric, and merging with the rotor discharge flow, a common exhaust conduit for receiving the rotor discharge flow and the bypassed flow, and valve means associated with the wastebox inlet opening for controlling the flow of fluid in the inlet conduit to the wastebox and nozzlebox respectively.

3. In a turbo-machine the combination of an axial flow rotor, means for supplying fluid in a generally axial direction to the rotor including an inlet conduit communicating with an arcuate chamber concentric with the rotor, said chamber containing a partition wall defining a radially inner arcuate nozzlebox having nozzle means for conducting fluid to the rotor and a radially outer wastebox having an inlet opening communicating with said inlet conduit and an outlet opening for bypassing fluid around the rotor to form a jet adjacent, substantially parallel to, and merging with the rotor discharge flow, a common exhaust conduit for receiving the turbine discharge flow and the bypass flow, and valve means arranged to control the flow of fluid from said inlet conduit to said wastebox.

4. In a turbo-machine the combination of a shaft, an axial flow rotor secured to the shaft, an inlet conduit including an inlet pipe and an annular nozzlebox concentric with the shaft and having an annular row of nozzles arranged to supply fluid in a generally axial direction to the rotor, means for bypassing fluid around the rotor including an annular wastebox having an inlet opening communicating with said inlet conduit, the wastebox being concentric with the nozzlebox and having an annular row of openings arranged to discharge bypassed fluid to form an annular jet substantially parallel to, concentric, and merging with the rotor discharge flow, a common exhaust conduit for receiving the rotor discharge flow and the bypassed flow, and pivoted butterfly valve means arranged to control the flow of fluid from the inlet conduit to the wastebox.

NEIL BURGESS.

REFERENCES CITED

The following references are of record in the file of this patent:

UNITED STATES PATENTS

| Number | Name | Date |
| --- | --- | --- |
| 2,168,726 | Whittle | Aug. 8, 1939 |
| 2,356,557 | Anxionnaz et al. | Aug. 22, 1944 |
| 2,385,366 | Lysholm | Sept. 25, 1945 |
| 2,388,952 | Clark | Nov. 13, 1945 |
| 2,393,713 | Shoults | Jan. 29, 1946 |
| 2,346,128 | Allen | Apr. 11, 1944 |
| 2,386,096 | Ehrling | Oct. 2, 1945 |

FOREIGN PATENTS

| Number | Country | Date |
| --- | --- | --- |
| 692,826 | France | Aug. 5, 1930 |
| 696,062 | Germany | Sept. 10, 1940 |
| 145,568 | Great Britain | Dec. 16, 1920 |
| 285,811 | Great Britain | Apr. 5, 1928 |